(12) United States Patent
Murakami et al.

(10) Patent No.: US 6,395,818 B1
(45) Date of Patent: May 28, 2002

(54) POLYARYLENE SULFIDE RESIN COMPOSITION FOR OPTICAL TELECOMMUNICATION MEMBERS

(75) Inventors: Tomoyoshi Murakami; Toru Iga; Shigemasa Suzuki, all of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/523,286

(22) Filed: Mar. 10, 2000

(30) Foreign Application Priority Data

Mar. 23, 1999 (JP) .......................................... 11-078013

(51) Int. Cl.⁷ .................................................. C08K 3/00
(52) U.S. Cl. ........................................ 524/492; 524/493
(58) Field of Search ................................... 524/492, 493

(56) References Cited

U.S. PATENT DOCUMENTS 4,690,972 A    9/1987   Johnson et al.
5,733,962 A    3/1998   Osako et al.
5,912,320 A *  6/1999   Hotta et al. .................. 528/373
6,042,910 A    3/2000   Kinouchi et al.

FOREIGN PATENT DOCUMENTS

| EP | 0 216 116 A1 | 4/1987 |
| EP | 0 704 490 A1 | 4/1996 |
| JP | 06299072     | 10/1994 |
| JP | 11349813     | 12/1999 |
| WO | WO 99/53353  | 10/1999 |

* cited by examiner

Primary Examiner—Edward J. Cain
(74) Attorney, Agent, or Firm—Oblon, Spivak, McClelland, Maier & Neustadt, P.C.

(57) ABSTRACT

Provided is a polyarylene sulfide (PAS) resin composition having extremely high dimensional accuracy and favorable to fiber-optics connector members, etc. The PAS resin composition for optical telecommunication members comprises (A) from 20 to 35% by weight of a polyarylene sulfide having a crystallization temperature, as measured through differential scanning calorimetry, of not lower than 250° C., and (B) from 65 to 80% by weight of silica, preferably spherical silica having a mean particle size of from 1 to 10 μm.

6 Claims, 1 Drawing Sheet

POLYARYLENE SULFIDE RESIN COMPOSITION FOR OPTICAL TELECOMMUNICATION MEMBERS

BACKGROUND OF THE INVENTION

1. Field of the Invention

The present invention relates to a polyarylene sulfide resin composition for optical telecommunication members. Precisely, it relates to a polyarylene sulfide resin composition favorable to optical telecommunication members such as fiber-optics connector ferrules, sleeves, etc.

2. Description of the Related Art

As having the advantages of good dimensional accuracy, mechanical strength and heat resistance, silica-containing epoxy resin compositions have heretofore been widely used for optical telecommunication members such as fiber-optics connector ferrules, sleeves and others in the field of optical telecommunication.

However, the epoxy resin compositions require long molding cycles, and mold units used for them must be cleaned out for every batch. Therefore, mass production of the resin moldings is limited. What is more, recycling sprue, runners and others for them is impossible, and the yield of the materials for them is low. Thus, they have various problems peculiar to thermosetting resins.

Substitutable for them, thermoplastic resin compositions such as those of polyarylene sulfide (PAS) resins have been proposed. For example, in Japanese Patent Laid-Open No. 196208/1982, proposed is a PAS resin composition containing a spherical filler; and in Japanese Patent Laid-Open No. 299072/1994, proposed is a PAS resin composition containing silica, in which the filler, silica is subjected to surface treatment with a silane coupling agent. In International Patent Laid-Open No. WO95/25770, proposed is a PAS resin composition containing whiskers and spherical silica.

However, the resin compositions proposed are still unsatisfactory with respect to dimensional accuracy, and their applications to single-mode fiber-optics connector members and others that require especially high dimensional accuracy are limited.

SUMMARY OF THE INVENTION

In that situation, the present invention is to provide a PAS resin composition having the advantage of extremely high dimensional accuracy and therefore favorable to fiber-optics connector members, etc.

We, the present inventors have assiduously studied PAS resin compositions for optical telecommunication members, while paying special attention to their dimensional accuracy, and, as a result, have found that the crystallization profile of PAS and its resin compositions has a great influence on the dimensional accuracy of the resin moldings. On the basis of this finding, we have completed the present invention.

Specifically, the invention provides the following:

1. A polyarylene sulfide resin composition for optical telecommunication members, which comprises (A) from 20 to 35% by weight of a polyarylene sulfide having a crystallization temperature, as measured through differential scanning calorimetry, of not lower than 250° C., and (B) from 65 to 80% by weight of silica.

2. A polyarylene sulfide resin composition for optical telecommunication members, which comprises (A') from 20 to 35% by weight of a polyarylene sulfide, and (B') from 65 to 80% by weight of silica, and which has a crystallization temperature, as measured through differential scanning calorimetry, of not lower than 250° C.

3. The polyarylene sulfide resin composition for optical telecommunication members of above 1 or 2, wherein the silica is a spherical silica having a mean particle size of from 1 to 10 $\mu$m.

Figure 1:
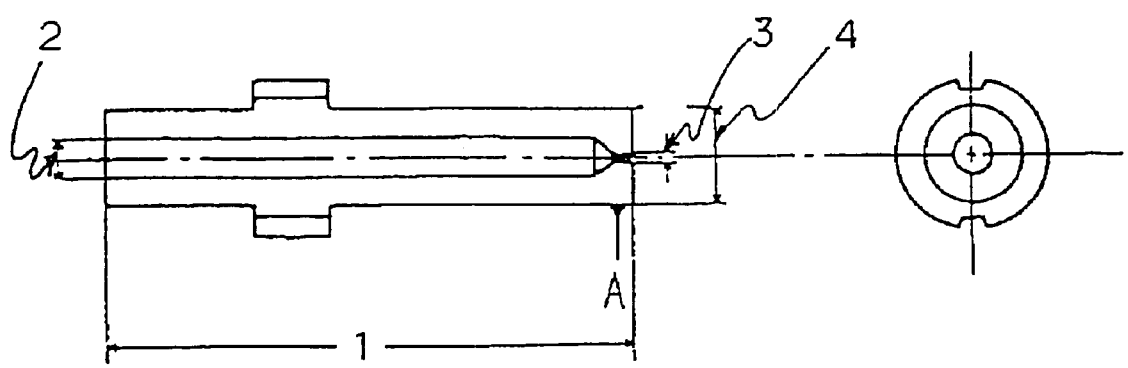
FIG. 1 is a sectional view graphically showing the outline of a fiber-optics connector ferrule to be tested for dimensional accuracy. In this, 1 indicates the length of the ferrule (14 mm); 2 indicates the diameter of the cross section of the optical fiber (1 $\Phi$); 3 indicates the diameter of the cross section of the welded part of the optical fiber (0.126 $\Phi$); and 4 indicates the outer diameter of the ferrule-sheathed part A (2.5 $\Phi$)

DESCRIPTION OF THE PREFERRED EMBODIMENTS (A) Polyarylene Sulfide:

The polyarylene sulfide for use in the invention is a polymer having at least 70 mol % of repetitive units of a structural formula, [—Ar—S—] wherein Ar indicates an arylene group and S indicates sulfur. Typically, it has at least 70 mol % of repetitive units of the following structural formula

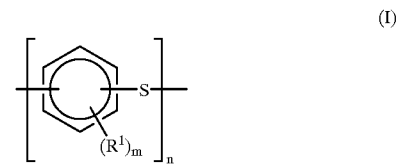

wherein $R^1$ indicates a substituent selected from an alkyl or alkoxy group having at most 6 carbon atoms, a phenyl group, a carboxyl group or its metal salts, an amino group, a nitro group, or a halogen atom including fluorine, chlorine and bromine atoms; m indicates an integer of from 0 to 4; and n indicates a mean degree of polymerization, falling between 10 and 300.

If the ratio of the repetitive units in the polymer is smaller than 70 mol %, the amount of the intrinsic crystalline component characteristic of crystalline polymers in the polymer will be small. If so, the mechanical strength of the polymer will be poor.

The polyarylene sulfide may be not only a homopolymer but also a copolymer.

The comonomer units for the copolymer polyarylene sulfide include, for example, metaphenylene sulfide units, orthophenylene sulfide units, p,p'-diphenyleneketone sulfide units, p,p'-diphenylenesulfone sulfide units, p,p'-biphenylene sulfide units, p,p'-diphenylenemethylene sulfide units, p,p'-diphenylenecumenyl sulfide units, naphthyl sulfide units, etc.

Regarding its molecular structure, the polyarylene sulfide may have any of a linear structure, a branched structure or a crosslinked structure, but preferably has a linear structure. Specifically, the polyarylene sulfide for use in the invention may be not only a polymer having a substantially linear structure but also a polymer having a branched structure or a crosslinked structure as formed through polymerization with a small amount of additional monomers having at least 3 functional groups. If desired, the branched or crosslinked polymer may be blended with the polymer having a substantially linear structure, for use in the invention.

Also if desired, the polyarylene sulfide for use in the invention may be oxidatively or thermally crosslinked with a polymer having a relatively low molecular weight and having a substantially linear structure to increase its melt viscosity thereby to improve its moldability.

The polyarylene sulfide for use in the invention must have a crystallization temperature (Tc), as measured through differential scanning calorimetry, of not lower than 250° C., preferably not lower than 252° C. If its Tc is lower than 250° C., the dimensional accuracy of the polymer will be poor.

The crystallization temperature of the polymer is measured through differential scanning calorimetry, for example, as follows:

A raw powder of PAS or pellets of its composition are kept heated at 50° C. for 1 minute in a nitrogen atmosphere, further heated up to 320° C. at a heating rate of 20° C./min, then kept at 320° C. for 2 minutes, and thereafter cooled at a cooling rate of 10° C./min. In this cycle, the DSC chart of PAS is recorded by the use of a Parking Elmer's differential scanning calorimeter (DSC-7). On the chart, the exothermic peak temperature is read, and it is the crystallization temperature (Tc) of the PAS Tested.

The method for producing the polyarylene sulfide having such a high crystallization temperature for use in the invention is known, for example, as disclosed in Japanese Patent Laid-Open No. 102228/1990. The method comprises reacting a dihalo-aromatic compound with a sulfur source through polycondensation in an organic polar solvent, followed by washing and drying the resulting polycondensate, and is characterized in that, after the former stage reaction, the solid product formed is purified by processing it in an organic amide solvent to remove the non-reacted materials, the oligomers and the polymerization inhibitors formed through the reaction from it to thereby make the thus-purified polymer have an increased crystallization temperature, and thereafter the polymer is subjected to the latter stage reaction.

Preferably, the polyarylene sulfide for use in the invention has a melt viscosity of from 150 to 1000 poises at its temperature of 300° C. and at a shear rate of 500 sec$^{-1}$. More preferably, its melt viscosity falls between 200 and 700 poises, even more preferably between 200 and 600 poises.

If its melt viscosity is larger than 1000 poises, the polymer will be poorly fluid while molded. If so, the dimensional accuracy of the polymer moldings will be poor, and the polymer will be difficult to granulate or pelletize. On the other hand, if its meltviscosity is smaller than 150 poises, the mechanical strength of the polymer products will be significantly low.

The method for measuring the melt viscosity of the polymer is described herein under.

Polymer products for use in optical telecommunication are desired to have good dimension stability even in wet. In order that the resin moldings of the invention could have good dimension stability even in wet, it is desirable that the sodium content of the polyarylene sulfide for use in the invention is at most 500 ppm, as sodium may often remain in the polymer as an impurity.

(B) Silica:

Silica for use in the invention may be any of fused silica (amorphous silicon dioxide), or crystalline silica (quartz, tridymite, cristobalite, etc.), or may also be in any form of their mixtures.

Of those, preferred for use herein is spherical silica. Broken amorphous silica, if added to PAS, will lower the fluidity of the resulting PAS composition, and the composition could hardly have well balanced physical properties.

Preferably, silica for use herein has a mean particle size of from 1 to 20 μm, more preferably from 1 to 15 μm, even more preferably from 1 to 10 μm, further more preferably from 1 to 6 μm. The mean particle size of silica may be measured by the use of a laser diffraction scattering particle size distribution analyzer. Silica having a mean particle size of larger than 20 μm, if added to PAS, will significantly lower the mechanical strength and even the surface smoothness of the resulting PAS moldings and will thereby often have some negative influences on the dimensional accuracy of the PAS moldings. On the other hand, silica having a mean particle size of smaller than 1 μm, if added thereto, will worsen the moldability of the resulting PAS composition because of the increasing melt viscosity and will thereby often have some negative influences on the dimensional accuracy of the PAS moldings. Also preferably, silica for use herein is subjected to surface treatment with a silane compound. Concretely, the silane compound include aminosilanes, vinylsilanes, phenylsilanes, epoxysilanes, etc. Of those, especially preferred are vinylsilanes as having good moisture resistance. Surface-treated silica is more effective for further improving the mechanical strength and even the moisture absorption resistance of the PAS moldings, and will therefore further improve the dimensional stability of the PAS moldings.

Formulation:

The polyarylene sulfide resin composition of the invention comprises (A) from 20 to 35% by weight, preferably from 20 to 30% by weight, more preferably from 22 to 28% by weight of a specific polyarylene sulfide such as that mentioned above and (B) from 65 to 80% by weight, preferably from 70 to 80% by weight, more preferably from 72 to 78% by weight of silica such as that also mentioned above.

Regarding the blend ratio of the components, if the amount of the polyarylene sulfide (A) is smaller than 20% by weight, the melt viscosity of the PAS composition will increase. If so, the moldability of the PAS composition will be poor, and therefore the dimensional accuracy of the PAS moldings will be poor. On the other hand, if the amount of the polyarylene sulfide (A) is larger than 35% by weight, the dimensional accuracy of the PAS moldings will be extremely poor. If the amount of the other component (B) silica is smaller than 65% by weight, the dimensional accuracy of the PAS moldings will be poor; but if larger than 80% by weight, the melt viscosity of the PAS composition will increase thereby to worsen the moldability, and, after all, the dimensional accuracy of the PAS moldings will be poor.

If desired, the resin composition comprising the components (A) and (B) may contain a coupling agent. Preferably, the coupling agent is a silane coupling agent selected from, for example, aminosilanes, vinylsilanes, phenylsilanes, and epoxysilanes. The amount of the coupling agent that may be in the resin composition may fall between 0.3 and 3.0 parts by weight, but preferably between 0.5 and 1.5 parts by weight, relative to 100 parts by weight of the total of the components (A) and (B). When the component (B) silane in the composition is not previously coated with a silane, adding such a coupling agent is especially effective.

If its amount is smaller than 0.3 parts by weight, the silane compound added to the resin composition will be ineffective for improving the mechanical strength of the resin moldings; but if larger than 3.0 parts by weight, the melt viscosity of the resin composition will increase whereby the moldability thereof will become poor.

In addition to the components mentioned above, the polyarylene sulfide resin composition of the invention may further contain any other components within the range not interfering with the effect of the invention. The additional optional components include, for example, various additives such as antioxidants, weather-proofing agents, lubricants, plasticizers, antistatic agents, colorants, etc.; thermoplastic resins and/or thermosetting resins such as polyamides, epoxy resins, silicone resins, silicone oils, polyolefins, polyether sulfones, polyphenylene ethers, etc.; rubbers such as hydrogenated SBS, hydrogenated NBR, silicone rubber, fluororubber, etc.; pigments; fibrous reinforcing agents such as glass fibers, carbon fibers, aluminium borate whiskers, zinc oxide whiskers, calcium silicate whiskers, calcium carbonate whiskers, potassium titanate whiskers, silicon carbide whiskers, etc.; inorganic fillers such as barium sulfate, calcium sulfate, calcium carbonate, kaolin, clay, pyrophyllite, bentonite, sericite, zeolite, mica, talc, wollastonite, glass beads, carbon beads, etc.

The polyarylene sulfide resin composition of the invention may be produced by formulating the components (A) and (B) and optionally a silane compound and other additives, mixing them in a Henschel mixer or the like, and kneading the resulting blend in melt generally at a temperature falling between 300 and 350° C., for example, in a single-screw extruder, a twin-screw extruder or the like.

The polyarylene sulfide resin composition has the advantage of extremely high dimensional accuracy. The method for measuring the dimensional accuracy of the composition will be described hereinunder. On the presumption that the composition is applied to ferrules of fiber-optics connectors for optical telecommunication, the dimensional accuracy of the composition is evaluated in terms of the circularity of the outer diameter of the ferrule made of the composition and of the eccentricity of the small hole thereof for the optical fiber to pass through the ferrule.

Regarding its crystallization profile, the polyarylene sulfide resin composition for optical telecommunication of the invention, which comprises (A') a polyarylene sulfide and (B') silica, shall have a crystallization temperature, as measured through differential scanning calorimetry, of not lower than 250° C.

Inmost crystalline resin compositions containing silica, silica has the capability of nucleation, therefore having an influence on the crystallization profile of the resin compositions. In polyarylene sulfide compositions containing silica, however, the silica's capability of nucleation is extremely low and is therefore almost ineffective for increasing the crystallization temperature of the compositions by 1° C. or more. Accordingly, the crystallization profile of the polyarylene sulfide resin composition of the invention shall directly follow the crystallization profile of the polyarylene sulfide itself in the composition.

The polyarylene sulfide resin composition of the invention has the advantage of extremely good dimensional accuracy, and is therefore favorable to various members for precision instruments and machines. In particular, it is favorable to ferrules and sleeves for fiber-optics connectors, optical pickup members, members for laser diodes, photosensors, etc.

EXAMPLES

The invention is described in more detail with reference to the following Examples, which, however, are not intended to restrict the scope of the invention.

The methods employed herein for testing the samples produced in Examples are mentioned below.
(1) Measurement of Melt Viscosity:
Using a capillograph (from Toyo Seiki), a resin sample was tested for measuring its melt viscosity (poises) at a resin temperature of 300° C. and at a shear rate of 500 sec$^{-1}$.

(2) Measurement of Mechanical Strength:
Using a 50-ton injection molding machine (from Japan Steel Works), test pieces (127 mm×12.7 mm square×3.2 mm thickness) were prepared at a resin temperature of 330° C. and at a mold temperature of 135° C., and tested according to ASTM.

Precisely, the flexural strength of each test piece was measured according to ASTM D 790.
(3) Measurement of Dimensional Accuracy:
A ferrule such as that illustrated in FIG. 1 (having a length of 14 mm—its cross section through which an optical fiber is to pass has a diameter of 1 Φ) was prepared through injection molding. The circularity of the outer diameter of the part A (2.5 Φ) of the ferrule, and the eccentricity of the small hole thereof (0.126 Φ) at the part A were measured by the use of a circularity meter (Roncom 1D Model from Tokyo Seimitsu).
(4) Total Evaluation:
From its dimensional accuracy and the flexural modulus thus measured, each sample was totally evaluated and grouped into the following four ranks A, B, C and D:

A: Excellent—the dimensional accuracy is extremely good and is well balanced with the strength.

B: Good—the dimensional accuracy is balanced with the strength.

C: Average—the balance between the dimensional accuracy and the strength is not so good, but acceptable for practical use.

D: Bad—the dimensional accuracy is not good, and is unacceptable for practical use.

The details of the components, polyarylene sulfide (a) and silica (b) used in Examples are mentioned below with respect to their types and properties.
(a) Polyarylene Sulfide:

PPS-1: polyphenylene sulfide (Idemitsu Petrochemical's IPC-R2, having a linear structure and having Tc of 260° C. and a melt viscosity of 160 poises).

PPS-2: polyphenylene sulfide (Idemitsu Petrochemical's IPC-N3, having a linear structure and having Tc of 256° C. and a melt viscosity of 280 poises)

PPS-3: polyphenylene sulfide (Idemitsu Petrochemical's IPC-N4, having a linear structure and having Tc of 253° C. and a melt viscosity of 420 poises).

PPS-4: polyphenylene sulfide (Idemitsu Petrochemical's IPC-N7, having a linear structure and having Tc of 255° C. and a melt viscosity of 650 poises).

PPS-5: polyphenylene sulfide (Idemitsu Petrochemical's IPC-N9, having a linear structure and having Tc of 252° C. and a melt viscosity of 920 poises).

PPS-6: polyphenylene sulfide (Idemitsu Petrochemical's IPC-N2, having a linear structure and having Tc of 245° C. and a melt viscosity of 160 poises).

PPS-7: polyphenylene sulfide (Idemitsu Petrochemical's IPC-P4, having a linear structure and having Tc of 242° C. and a melt viscosity of 440 poises).

PPS-8: polyphenylene sulfide (Topren's LN-2, having a linear structure and having Tc of 247° C. and a melt viscosity of 900 poises).

PPS-9: polyphenylene sulfide (Topren's T-1, having a semi-linear structure and having Tc of 227° C. and a melt viscosity of 290 poises).

PPS-10: polyphenylene sulfide (Toso's #140, having a crosslinked structure and having Tc of 244° C. and a melt viscosity of 260 poises).

(b) Silica:

Silica-1: Surface-treated spherical silica having a mean particle size of 1 μm (Admatex's SO-C3 processed with vinyl silane, Toray-Dow Corning Silicone's SZ6300).

Silica-2: Spherical silica having a mean particle size of 5 μm (Tatsumori's TSS-6).

Silica-3: Surface-treated spherical silica having a mean particle size of 5 μm (Tatsumori's TSS-6 processed with vinyl silane, Toray-Dow Corning Silicone's SZ6300).

Silica-4: Surface-treated spherical silica having a mean particle size of 6 μm (Denki Kagaku Kogyo's FB-6D processed with epoxysilane, Toray-Dow Corning Silicone's SH6040).

Silica-5: Surface-treated spherical silica having a mean particle size of 12 μm (Denki Kagaku Kogyo's FB-35 processed with epoxysilane, Toray-Dow Corning Silicone's SH6040).

Silica-6: Surface-treated, broken (amorphous) silica having a mean particle size of 15 μm (Denki Kagaku Kogyo's FS-74C processed with epoxysilane, Toray-Dow Corning Silicone's SH6040).

Example 1

The components (a) and (b) were blended in the ratio as in Table 1. Precisely, the component (a), PPS-6 (26% by weight) and the component (b), silica-3 (74% by weight) were uniformly blended by the use of a Henschel mixer. The resulting blend was kneaded in melt at a resin temperature falling between 300 to 350° C. and pelletized by the use of a double-screw extruder (TEM35B). The pellets were tested for the dimensional accuracy and the mechanical strength of the moldings and for the crystallization temperature of the composition, and were totally evaluated from the test data. The results are given in Table 1.

Examples 2 to 12, Comparative Examples 1 to 10

In the same manner as in Example 1, the components (a) and (b) were uniformly blended in different ratios as in Tables 1 and 2 by the use of a Henschel mixer, and the resulting blends were separately kneaded in melt at a resin temperature falling between 300 to 350° C. and pelletized by the use of a twin-screw extruder (TEM35B). The pellets were tested for the dimensional accuracy and the mechanical strength of the moldings and for the crystallization temperature of each composition, and were totally evaluated from the test data. The results are given in Tables 1 and 2.

TABLE 1

(Unit or formulation of component is wt %)

| Formulation and Test Results | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| PPS-1 | 26 | | | | | 23 | | | | | | |
| PPS-2 | | 26 | 26 | | | | 26 | | | | 27 | 26 |
| PPS-3 | | | | 26 | | | | | 30 | | 32 | |
| PPS-4 | | | | | 28 | | | | | | | |
| PPS-5 | | | | | | | | | | 32 | | |
| PPS-6 | | | | | | | | | | | | |
| PPS-7 | | | | | | | | | | | | |
| PPS-8 | | | | | | | | | | | | |
| PPS-9 | | | | | | | | | | | | |
| PPS-10 | | | | | | | | | | | | |
| Silica-1 | | | 24 | | | | 30 | 10 | | | | |
| Silica-2 | | | | | | 72 | 47 | | | | | |
| Silica-3 | 74 | 74 | 50 | 74 | | | | 44 | | 68 | 43 | |
| Silica-4 | | | | | | | | | 70 | | | |
| Silica-5 | | | | | | | | 20 | | | | 74 |
| Silica-6 | | | | | | | | | | 68 | 30 | |
| Outer Diameter Circularity (μm) | 0.3 | 0.4 | 0.4 | 0.5 | 0.4 | 0.2 | 0.3 | 0.7 | 0.8 | 0.9 | 0.5 | 0.4 |
| Eccentricity (μm) | 0.5 | 0.7 | 0.6 | 0.8 | 0.8 | 0.4 | 0.5 | 1.1 | 1.4 | 1.5 | 0.9 | 0.7 |
| Flexural Strength (MPa) | 127 | 140 | 145 | 148 | 161 | 115 | 134 | 155 | 164 | 138 | 121 | 103 |
| Tc of Composition (° C.) | 260 | 255 | 256 | 253 | 255 | 259 | 260 | 253 | 252 | 253 | 255 | 256 |
| Total Evaluation | A | A | A | A | A | A | A | B | C | C | B | C |

Total Evaluation: A, Excellent; B, Good; C, Average; D, Bad.

TABLE 2

(Unit of formulation of component is wt %)

| Formulation and Test Results | Comparative Examples | | | | | | | | | |
|---|---|---|---|---|---|---|---|---|---|---|
| | 1 | 2 | 3 | 4 | 5 | 6 | 7 | 8 | 9 | 10 |
| PPS-1 | | | | | | | 37 | | | |
| PPS-2 | | | | | | | | 18 | | |
| PPS-3 | | | | | | | | | | |
| PPS-4 | | | | | | | | | | |
| PPS-5 | | | | | | | | | | |
| PPS-6 | 26 | | | | | | | | 30 | 32 |
| PPS-7 | | 26 | | | | | | | | |
| PPS-8 | | | 32 | | | | | | | |
| PPS-9 | | | | | 26 | | | | | |
| PPS-10 | | | | 26 | | 27 | | | | |
| Silica-1 | | | | 24 | 10 | | | | | |
| Silica-2 | | | | | | | | | | |
| Silica-3 | 74 | 74 | 68 | | 44 | 43 | 63 | 82 | | |
| Silica-4 | | | | 50 | | | | | 70 | |
| Silica-5 | | | | | 20 | | | | | |
| Silica-6 | | | | | | 30 | | | | 68 |
| Outer Diameter Circularity (μm) | 1.1 | 1.6 | 1.3 | 1.6 | 2.4 | 1.5 | 1.2 | Failed to knead the composition. | 1.9 | 2.1 |
| Eccentricity (μm) | 2.0 | 2.8 | 2.2 | 2.6 | 3.9 | 3.1 | 2.1 | | 3.5 | 4.0 |
| Flexural Strength (MPa) | 125 | 149 | 156 | 144 | 137 | 122 | 136 | | 153 | 139 |
| Tc of Composition (° C.) | 245 | 241 | 247 | 244 | 227 | 243 | 259 | | 242 | 241 |
| Total Evaluation | D | D | D | D | D | D | D | D | D | D |

Total Evaluation: A, Excellent; B, Good; C, Average; D, Bad.

As described in detail hereinabove with reference to its embodiments, the resin composition of the invention has the advantages of extremely high dimensional accuracy and mechanical strength. In addition, the crystallization temperature of the composition is high, concretely not lower than 250° C. From the data in Examples 1, 2 and 4, it is understood that the dimension accuracy of the resin moldings increases with the increase in the crystallization temperature of the composition. From the data in Examples 2 and 12, it is understood that the flexural modulus of the resin moldings is high so far as the particle size of silica in the composition falls between 1 and 10 μm. The moldings of the resin composition of the invention are favorable to precision members for optical telecommunication, for example to ferrules of fiber-optics connectors for sheathing the welded area of optical fibers as in FIG. 1 which require high dimensional accuracy.

What is claimed is:

1. A polyarylene sulfide resin composition, which comprises (A) from 20 to 35% by weight of a polyarylene sulfide having a crystallization temperature, as measured through differential scanning calorimetry, of not lower than 250° C., and (B) from 65 to 80% by weight of silica, wherein the silica is a spherical silica having a mean particle size of from 1 to 10 μm, and said silica having been optionally surface treated with a silane compound.

2. A polyarylene sulfide resin composition, which comprises (A') from 20 to 35% by weight of a polyarylene sulfide, and (B) from 65 to 80% by weight of silica, and which has a crystallization temperature, as measured through differential scanning calorimetry, of not lower than 250° C., wherein the silica is a spherical silica having a mean particle size of from 1 to 10 μm, and said silica having been optionally surface treated with a silane compound.

3. The polyarylene sulfide resin composition of claim 1, wherein said crystallization temperature is not lower than 252° C.

4. The polyarylene sulfide resin composition of claim 2, wherein said crystallization temperature is not lower than 252° C.

5. The polyarylene sulfide resin composition of claim 1, wherein said crystallization temperature is not lower than 256° C.

6. The polyarylene sulfide resin composition of claim 2, wherein said crystallization temperature is not lower than 256° C.

* * * * *